United States Patent [19]

Holter

[11] Patent Number: 5,039,121
[45] Date of Patent: Aug. 13, 1991

[54] TRI-SKATER

[75] Inventor: Donovan A. Holter, Steilacoom, Wash.

[73] Assignee: Rick L. Hardin, Steilacoom, Wash.

[21] Appl. No.: 419,976

[22] Filed: Oct. 11, 1989

[51] Int. Cl.$^5$ .............................................. B62M 1/00
[52] U.S. Cl. .................................. 280/220; 280/87.041
[58] Field of Search ............ 280/11.115, 11.12, 11.19, 280/11.2, 12.1, 14.3, 214, 220, 87.041, 87.05, 62, 87.2, 800

[56] References Cited

U.S. PATENT DOCUMENTS

| | | | |
|---|---|---|---|
| 210,435 | 12/1878 | Root | 280/87.04 X |
| 887,812 | 5/1908 | Johnson | 280/220 |
| 2,980,437 | 4/1961 | Fisher | 280/62 X |
| 4,047,732 | 9/1977 | Williams et al. | 280/220 X |
| 4,071,261 | 1/1978 | Winchell | 280/220 |
| 4,076,270 | 2/1978 | Winchell | 280/220 |
| 4,087,107 | 5/1978 | Winchell | 280/220 |
| 4,088,338 | 5/1978 | Winchell et al. | 280/220 |
| 4,123,079 | 10/1978 | Biskup | 280/220 |
| 4,165,093 | 8/1979 | Biskup | 280/220 |
| 4,526,390 | 7/1985 | Skolnik | 280/62 X |
| 4,540,192 | 9/1985 | Shelton | 280/220 X |

FOREIGN PATENT DOCUMENTS 2544621 10/1984 France ............................. 280/11.2

*Primary Examiner*—Charles A. Marmor
*Assistant Examiner*—Alan M. Kajen
*Attorney, Agent, or Firm*—Hoffman, Wasson & Gitler

[57] ABSTRACT

A three-wheeled vehicle having no driving connection to the wheels is powered by side-to-side forces applied by the operator to a pair of foot boards, each of which has a castered rear wheel having a pivot axis that is inclined with respect to the vertical. The forward ends of the foot boards are connected to a vertical steering head supporting a single front wheel. In one embodiment, the distance between the foot boards may be varied to suit riders of different sizes by changing the effective length of a crossmember rigidly interconnecting the footboards.

4 Claims, 4 Drawing Sheets

TRI-SKATER

BACKGROUND

This invention relates generally to the field of land vehicles, and more particularly to an occupant-propelled threewheeled scooter or skate-type vehicle. One species of such vehicle has been called "cambering vehicles" by some prior inventors. Vehicles of the three-wheeled scooter type are disclosed in U S. Pat. Nos. 4,165,093, 4,123,079, 4,076,270, 4,088,338, 4,071,261, 4,047,732, and 4,540,192.

A cambering vehicle typically includes a single front wheel mounted at the lower end of a rearwardly inclined pivotable fork controlled by handlebars, and two rear wheels at the ends of struts extending rearward from the steering head. Footpads are provided along the struts. In most cases, the struts may pivot up and down independently, and the rear wheels are mounted upon axles that are fixed with respect to the struts.

In the U.S. Pat. No. 4,540,192 (Shelton), in contrast to the cambering vehicles, the struts cannot move vertically with respect to the fork or vertically with respect to each other; instead, the rear wheels have caster mountings which may pivot in relation to the struts, about respective vertical axes. My vehicle is more like that of Shelton in these respects; however, Shelton's vehicle is also characterized by the fact that its footboards are mounted for independent lateral movement, because it is intended to be propelled by moving the boards alternately together and apart, rather than in unison from side to side. The relative difficulty of riding a device with independent footboards can readily be imagined.

Thus, the prior Vehicles have had to provide footpad struts that were independently swingable, either vertically, in order to obtain the cambering of the front wheel necessary for propulsion, or horizontally. The result of either construction is an inherently unstable structure unsuitable for use by many people.

Shelton's device included rear casters having vertical kingpins, and return springs Were provided to encourage the wheels to return to the straight-ahead position. In this respect, my vehicle represents a significant departure from Shelton and from the other prior devices. I have found that one may obtain easier propulsion, and simpler construction, by providing the rear wheels of a vehicle of this type with caster mountings having pivot axes that are inclined forwardly with respect to the vertical, in the direction of motion. With this arrangement, the casters are biased by the weight of the vehicle and operator, to the forward position; return springs or the like are not required. In addition, the footboards of my vehicle are rigidly interconnected, both laterally and vertically, to provide a stable platform for the operator, whose rhythmic side-to-side motion produces a forward thrust at the casters that propels the vehicle forward.

SUMMARY OF THE INVENTION

In view of the foregoing, it is an object of this invention to provide a three-wheeled occupant-propelled vehicle with a stable platform for the operator.

Another object of the invention is to obviate the need for relative movement of the footpad struts in order to obtain propulsion in a vehicle of this type.

A third object is to simplify the construction of vehicles of the present type, and to eliminate the need for return springs, in order to achieve propulsion.

A further object is to provide a particularly safe and easy-to-use vehicle suitable for people of all ages.

The invention is summarized as a three-wheeled occupant-propelled vehicle including a rigid frame, a steering fork pivotally mounted in said frame for rotation about a steering axis, a front wheel supported by said steering fork, a pair of footboards extending rearwardly from said frame, a pair of rear wheels, each attached at the rear of a respective one of said footboard by means of a swivel caster having a pivot axis inclined forwardly with respect to the vertical.

BRIEF DESCRIPTION OF THE DRAWINGS

In the accompanying drawings.

DESCRIPTION OF THE PREFERRED EMBODIMENT

Figure 1:
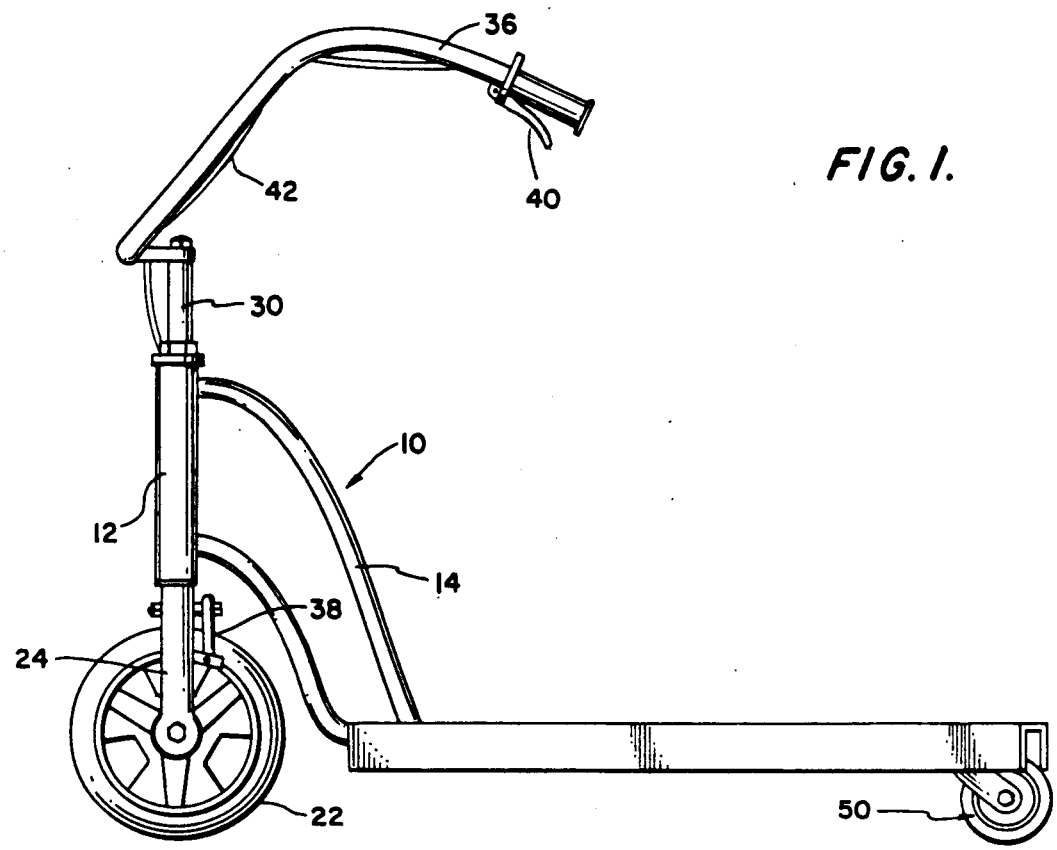
FIG. 1 is a side elevation of a vehicle embodying the invention.
Figure 2:
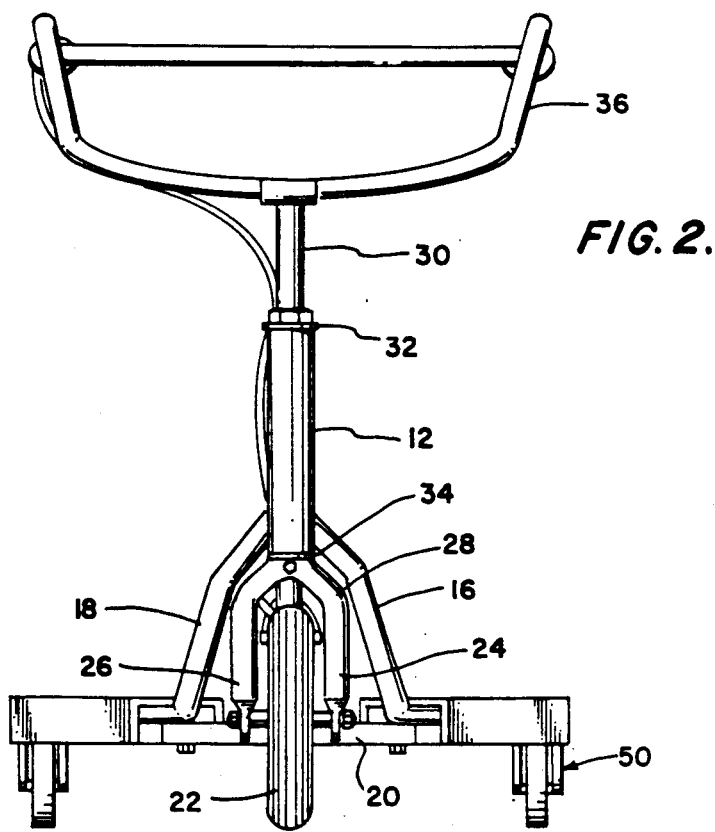
FIG. 2 is a front elevation of the vehicle.
Figure 3:
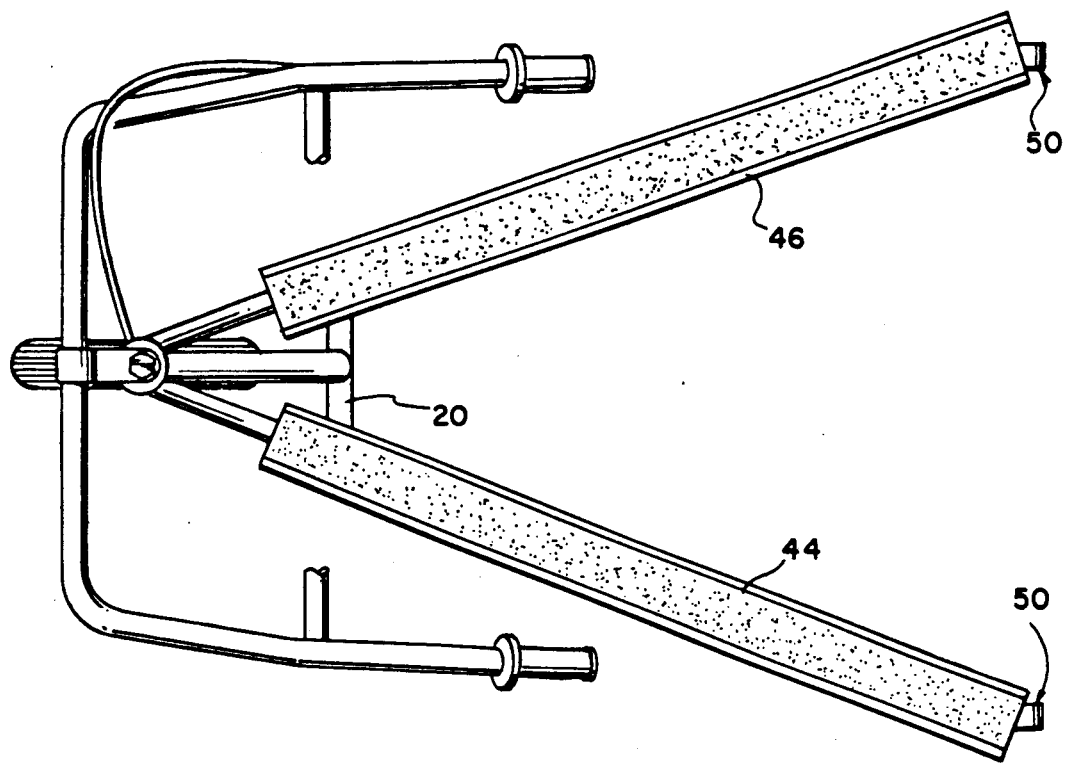
FIG. 3 is a top view thereof.

As shown in FIGS. 1-3, a vehicle embodying the invention includes a welded tubular frame 10 comprising a substantially vertical steering head tube 12, an upper fork tube 14 extending rearward and obliquely downward from the top of the head, and a pair of lower fork tubes 16, 18 (FIG. 2) interconnected by a transverse brace 20. The rear end of the upper fork tube 14 is secured to the center of the transverse brace. Thus, the frame 10 is a rigid structure, and in this embodiment cannot be disassembled, since the joints are preferably formed by welding.

The front wheel 22 of the vehicle is mounted between the ends of a pair of tines 24, 26 at the lower end of a fork 28 having a shaft 30 which extends through the steering head tube 12, which is vertical (i.e., perpendicular to the ground). Bearings 32, 34 permit the shaft to rotate freely with respect to the steering head tube. A back-swept handlebar 36 is connected at the upper end of the steering shaft. A brake caliper 38, operated by a hand lever 40 via a Bowden cable 42, is also included.

The rear portion of the vehicle comprises a pair of divergent horizontal footboards 44, 46 (FIG. 3), made from U-channel aluminum, or alternatively from plastic or other material. Each footboard is rigidly connected, by means of a pin or bolt, to the transverse brace 20. In this embodiment, the transverse brace prevents relative movement between the footboards, in the horizontal direction, producing a rigid and thus particularly stable structure. In the preferred embodiment, each footboard is parallel to and approximately six inches above the ground.

Figure 4:
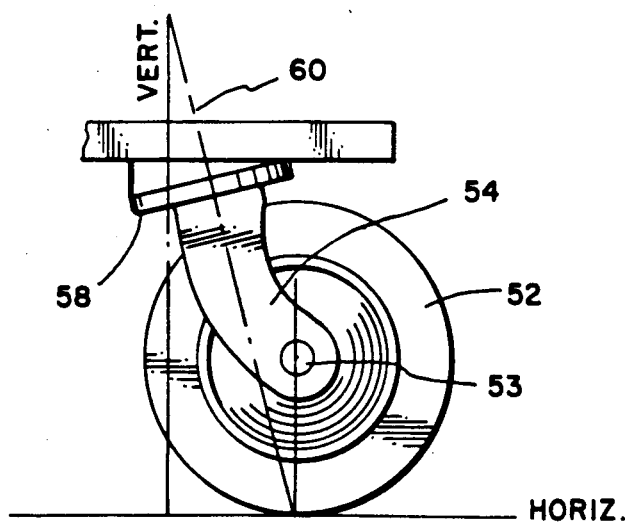
FIG. 4 is a detail view, in side elevation, partially broken away, of one rear wheel caster assembly of the vehicle.
Figure 5:
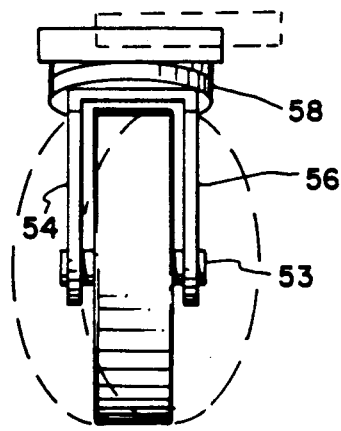
FIG. 5 is a rear elevation thereof.
Figure 6:
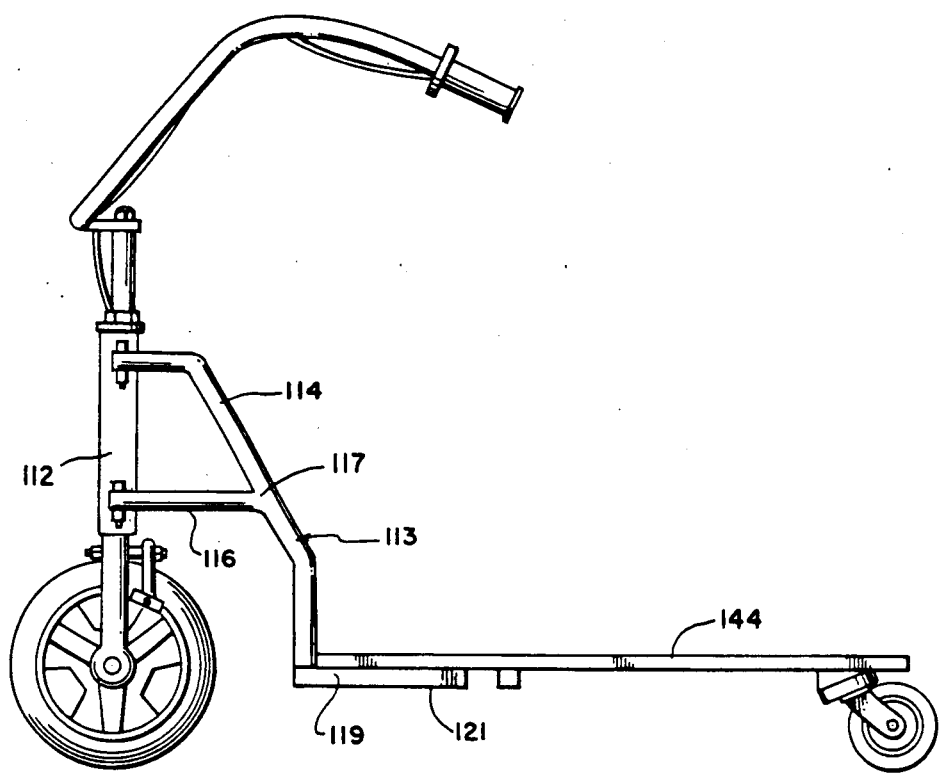
FIG. 6 is a side elevation of a second embodiment of the invention.

A caster wheel assembly 50 is affixed to the bottom of each of the footboards, at the rear thereof. Each assembly 50 comprises, as shown in FIGS. 4 and 5, a wheel 52 mounted on an axle 53 Whose ends are supported by respective plates 54, 56 (FIG. 5) extending downward from a common lower bearing plate 58 which may pivot freely about the axis 60 of an upper bearing plate affixed to the footboard. The axis 60 is forwardly inclined, in a plane aligned with the direction of vehicle movement; the deviation from the vertical (angle o in FIG. 4) is within the range of 1° to 50° preferably within the range of 10° to 50°, and most preferably about 20°. It will be noted as well that the swivel provides positive caster; that is, the contact point of the wheel with the ground lies behind the spot at which the pivot axis would, if extended, intersect the ground, as can be seen from FIG. 4. This causes the wheel to pivot left when right-hand force is applied to the footboards, and vice-versa.

The angularity of the pivot axis 60 causes the footboard to rise, as suggested by the broken lines (representing footboard positions) in FIG. 5, when the wheel deviates from alignment with a vertical plane containing the axis. Thus, potential energy (i.e., the elevation of the mass of the vehicle and its rider) is minimized when the rear wheels are straight ahead, and so the wheels tend to return to this position without the need for return springs or the like.

In operation, one stands on the footboards, slightly ahead of the casters, grasps the handlebar, and shifts one's weight alternately from side to side. The sideways forces thus applied to the rear of the vehicle cause the casters to deviate from straight ahead, so that the lateral reaction force from the ground on the caster Wheels has a component in the forward direction, which produces forward propulsion. As the sideways force is released, the Wheel caster returns the wheel to its neutral position. While the rear portion of the vehicle undergoes some lateral reciprocating motion, as its rear wheels pivot from side to side, the vehicle as a whole follows the steady path of the front wheel, whose direction is controlled by the handlebars. As a result, the vehicle is very easily controlled and propelled, even by inexperienced or unathletic riders.

The technique of riding the vehicle is similar to that of ice skating, in that, the greater the force applied initially, the sharper the angle of stroke and the greater the acceleration of the vehicle. As forward speed increases, the driving effort may be reduced, and the length of the stroke increased.

FIGS. 6-10 show an alternative form of the invention, characterized by a knock-down construction that enables one to disassemble and stow the vehicle quickly and easily. In this embodiment, there are two geometrically symmetrical y-shaped frame subassemblies 113, 115, each of which includes an upper fork tube 114 and a lower tube 116 welded thereto. The upper tube continues downward from the welded joint 117 to a foot 119, 121, to which a respective one of the footboard struts 144, 146 is attached. An eye 123 is provided at the forward end of each of the frame tubes, and the upper and lower eyes have coaxial bores.

Figure 7:
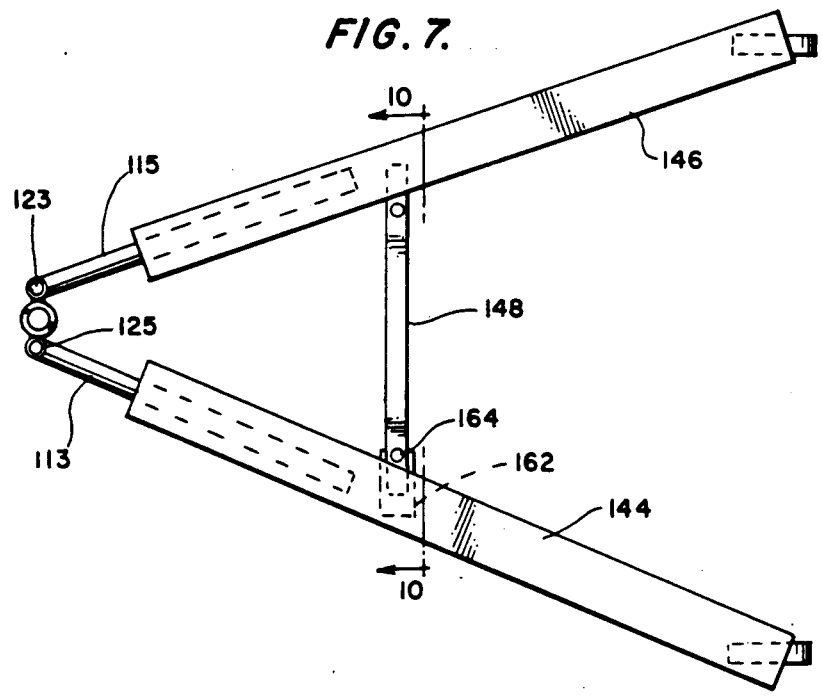
FIG. 7 is a top view thereof.
Figure 8:
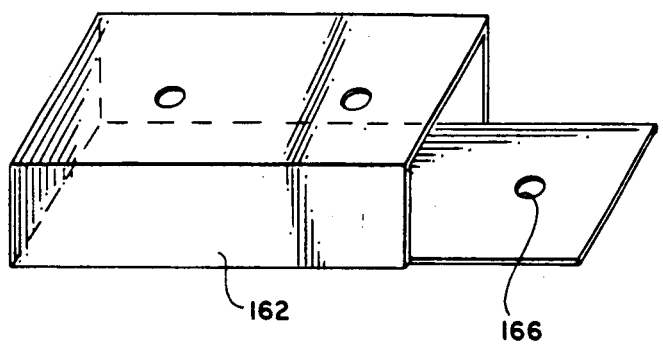
FIG. 8 is a detail, in perspective, of a bracket shown in FIG. 7.
Figure 9:
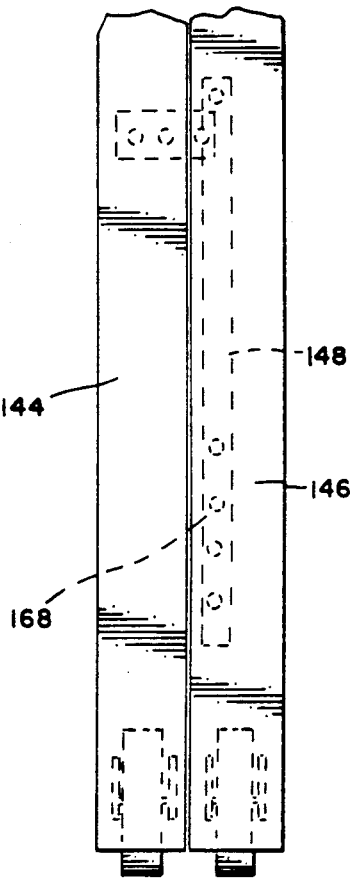
FIG. 9 is a top view of a rear portion of the second embodiment of the invention, in its collapsed position.
Figure 10:
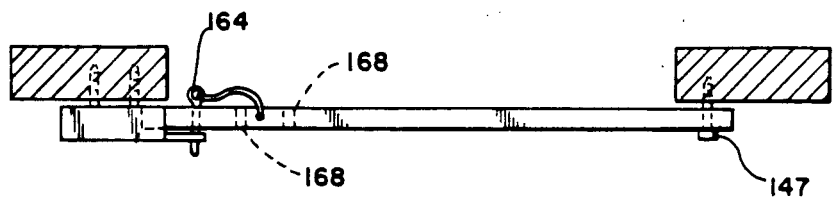
FIG. 10 is a sectional view, taken along the line 10—10 in FIG. 7.

The steering tube 112 has a two pairs of hinges or pins 125 welded to its sides, one pair on either side, in positions corresponding to the intended location of the upper and lower tube ends. The frame subassemblies are attached to the steering tube simply by placing the eyes 123 over their respective hinge pins 125. The purpose of the pin connections is not to permit the frame subassemblies to pivot with respect to the steering tube, but only to facilitate assembly/disassembly. Therefore, a crossmember 148, shown in FIGS. 7, 9 and 10, is provided, in order to rigidly interconnect the footboard struts. One end of the crossmember 148 is pivotally connected to one of the footboard struts, 146, by means of a bolt 147 or the like, as shown in FIG. 10. The other end is received in a box-shaped bracket 162, shown in detail in FIG. 8, and secured therein by means of a clevis pin 164 tethered to the crossmember itself. The pin passes through a hole 166 in the bracket and one of several holes 168 in the crossmember. The plural hole arrangement allows one to adjust the footboard spacing as desired.

In all respects other than those described, the second embodiment is identical to the first, and other than for assembly and disassembly, operation is the same.

Certain modifications to either embodiment, within the scope of the invention, will occur to those of skill in the art. For example, the wheels of the device could be replaced by tandem wheel sets for added stability, and more generally, these and other parts might be replaced by functional equivalents. Inasmuch the embodiment described above is subject to other variations and modifications, it is intended that the invention should be measured by the following claims.

What is claimed is:

1. A three-wheeled occupant-propelled vehicle comprising
    a rigid frame,
    a steering fork pivotally mounted in said frame for rotation abut a steering axis,
    a front wheel supported by said steering fork,
    a pair of footboards extending rearwardly from said frame, and
    a pair of rear wheels, each attached at the rear of a respective one of said footboards by means of a swivel caster having a pivot axis inclined forwardly with respect to the vertical, and
    a crossmember connected between said footboards, so as to prohibit relative movement therebetween,
    wherein said frame comprises a steering tube and a pair of frame subassemblies connected thereto by means of quick-disconnect fasteners, each of said footboards being connected to a respective one of said frame subassemblies,
    wherein said crossmember has a series of alternative connecting points so that its effective length, and consequently the spread of the footboards, may be altered,
    wherein said crossmember is pivotally connected to one of said footboard struts, and further comprising a bracket connected to the other of said struts, said bracket defining a recess for receiving one end of said crossmember, and having means for securing said crossmember therein.

2. The invention of claim 1 wherein said pivot axis is inclined forwardly at angle from the vertical, said angle being in the range of 1° to 50°.

3. The invention of claim 1, wherein said pivot axis is inclined forwardly at angle from the vertical, said angle being in the range of 10° to 50°.

4. The invention of claim 1, wherein said pivot axis is inclined forwardly at angle from the vertical, said angle being about 20°.

* * * * *